United States Patent [19]

Zügner

[11] Patent Number: 4,779,547
[45] Date of Patent: Oct. 25, 1988

[54] AIR SUPPLY NOZZLE FOR A FLUID BED FURNACE

[75] Inventor: Anton Zügner, Gothenburg, Sweden

[73] Assignee: Gotaverken Energy Systems AB, Gothenburg, Sweden

[21] Appl. No.: 152,386

[22] Filed: Feb. 4, 1988

[30] Foreign Application Priority Data

Feb. 6, 1987 [SE] Sweden .............................. 8700456

[51] Int. Cl.$^4$ ............................................ F23L 15/00
[52] U.S. Cl. .................................. 110/297; 34/57 A; 122/4 D; 165/104.16; 239/288.3; 239/567; 431/170
[58] Field of Search ............... 110/297, 245; 122/4 D; 165/104.16; 431/7, 170; 34/57 A; 239/288, 288.3, 288.5, 567

[56] References Cited

U.S. PATENT DOCUMENTS

| | | | |
|---|---|---|---|
| 1,156,845 | 10/1915 | James | 239/567 X |
| 2,866,413 | 12/1958 | Roquemore | 239/567 X |
| 3,921,913 | 11/1975 | Capy | 239/567 X |
| 4,387,667 | 6/1983 | Goodstine et al. | 122/4 D |
| 4,628,868 | 12/1986 | Eaton | 122/4 D |
| 4,656,971 | 4/1987 | Eaton et al. | 110/245 X |

Primary Examiner—Edward G. Favors
Attorney, Agent, or Firm—Holman & Stern

[57] ABSTRACT

An air supply nozzle for a fluid bed furnace comprises a tubular member attachable to a plate, forming the bottom of the furnace. The tubular member is upwardly closed by a lid and just below the same a number of air dispersing openings are provided. A wear-resisting ring of hard metal is attached to the upper end of the tubular member and has a thickness and a height noticeably exceeding the wall thickness of the tubular member. The void within the ring is filled with refractory concrete so a dome projecting above the ring is formed. The tubular member includes a un-perforated portion, which has such an extension that the tubular member, after a hard wear, may be cut, a lower stub of the tubular member remaining at the plate, while the top is substituted by a new portion. The two portions of the reconditioned tubular member are then connected by an internal supporting sleeve and tack welding.

6 Claims, 1 Drawing Sheet ment 11, and is welded to the latter so it will project a distance below its lower edge.

AIR SUPPLY NOZZLE FOR A FLUID BED FURNACE

BACKGROUND OF THE INVENTION

The supply of fluidizing air to fluid bed furnaces can occur in many different ways. In some embodiments a number of nozzles are used, which project from a plate forming the bottom of the furnace. These nozzles are formed as upwardly closed lengths of tubes, which have air dispersing openings in their shells.

The fluidized bed material, which beside particles of fuel, includes sand and/or crushed limestone, will subject the projecting nozzles to a hard wear, which makes continued repair work necessary.

An additional trouble is that the fitting of the nozzles to the plate is regarded as a qualified work, which must be performed by a licensed welder.

The object of the present invention is to design the individual nozzle so it obtains a high degree of wear resistance, and is generally so formed that—when a survey is required—a substantial part of a nozzle may be rapidly substituted by a new wear-resisting component, without much work.

SUMMARY OF THE INVENTION

As a separate machine element the nozzle is characterized in that it comprises a tubular member and a lid closing one end thereof, the tubular member being provided with a number of air dispersing nozzles in the portion of its shell adjacent to the lid and having an un-perforated portion extending to its other end, which is formed for permanent attachment to a plate forming the bottom of the furnace, and wherein a wear-resisting ring of a hard metal is fitted to the closed end of the tubular member in such a manner that a void for refractory concrete is formed inside the ring, and above the lid.

The tubular member is preferably composed of two pieces mutually supported by a sleeve and connected by tack welding.

An air supply arrangement for a fluid bed furnace according to the invention is characterized in that the air dispersing openings are located adjacent to the top end of the tubular member, leaving an un-perforated portion of the shell adjacent to the plate, and that a ring of hard metal with a thickness being noticeably bigger than the thickness of the tubular member and with a height at least corresponding to the wall thickness of its own is attached to the closed end of the tubular member in such a manner that the ring will project upward and outward of the tubular member, the void within the ring being filled with refractory concrete.

A lid which upwardly closes the tubular member is preferably fitted somewhat below the upper edge of the tubular member.

The refractory concrete is advantageously formed like a dome projecting above the ring.

The un-perforated portion of the tubular member preferably has such extension that it can be cut below the air dispersing openings, and a new top portion, having openings, a ring and refractory concrete dome may be attached to the stub of the tubular member by means of an internal supporting sleeve forming part of the top portion.

DESCRIPTION OF A PREFERRED EMBODIMENT

Figure 1:
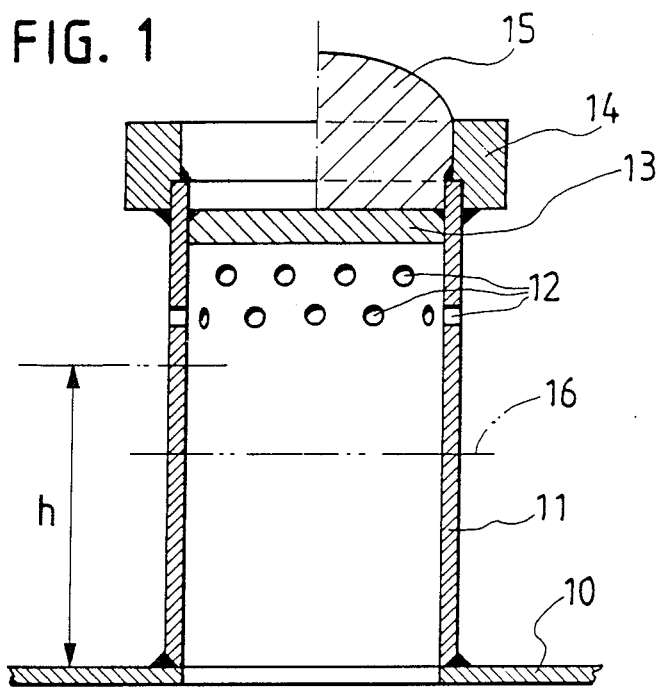
FIG. 1 shows a section through an air supply nozzle according to one embodiment of the invention.

FIG. 1 shows a basic embodiment of the invention, one of a number of nozzles to be mounted in, and projecting from a plate 10, forming the bottom of a furnace, which is not shown in the drawing.

A nozzle of the actual type includes a tubular member 11, one end of which is shaped to be permanently welded to the plate 10. As this plate forms part of the walls defining the furnace, great care must be taken with respect to the joining, which is made by a licensed welder.

The tubular member 11 extends with an un-perforated portion "h" up from the plate, and is in its upper portion provided with a number of air dispersing openings 12 in its shell. The space below the plate 10 serves as an air distribution chamber, from which air in a conventional manner is supplied to the furnace.

A lid 13 closes the upward end of the tubular member 11, and is mounted somewhat below the upper edge of the member.

The most turbulent movement of the bed particles occurs around these air openings 12. This part will therefore be subjected to the most severe wear.

In order to, as far as possible, prevent the wear acting directly upon the tubular member 11, the latter is at its upper end provided with a wear resisting ring 14 of a hard metal alloy, which has a height, and a thickness being noticeably bigger than the wall thickness of the tubular member.

The ring 14 is mounted in such a manner, that it projects above the edge of the tubular member. The void formed within the ring 14 and in the tubular member 11, above the lid 13, is filled with refractory concrete 15, so a dome extending above the ring is formed.

The composition of the refractory concrete may vary, but it is an article well known to people associated with furnaces, where it is used for covering the internal wall faces.

After some time even the ring 14 and the concrete dome 15 will be worn down, and the design of the nozzle now makes it possible to substitute the top portion of the nozzle, without disturbing the license welding at the plate 10.

The tubular member will then be cut along line 16, and it is important that the un-perforated portion has sufficient extension "h" to permit the use of an internal support sleeve 17 (FIG. 2), without blocking the air supply openings 12.

Figure 3:
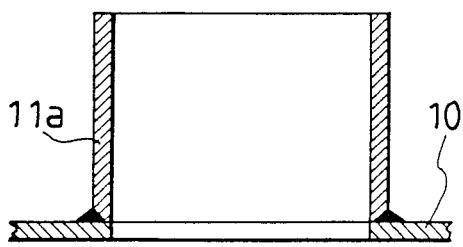

When the worn top portion has been removed, a stub portion 11a of the tubular member remains at the plate—see FIG. 3.

Figure 2:
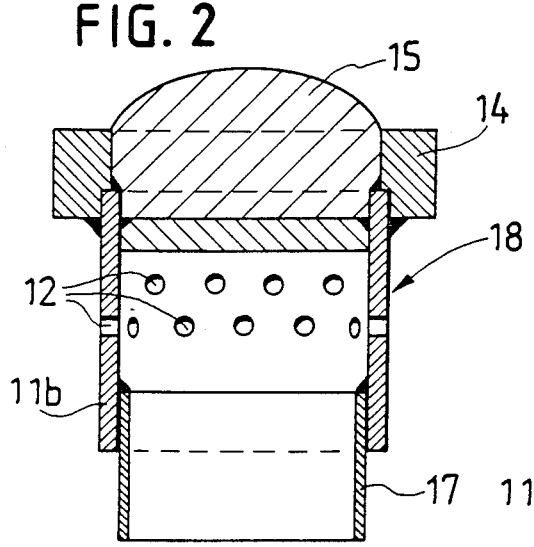
FIGS. 2 and 3 show parts of a similar air supply nozzle according to a development of the invention, or a repaired nozzle according to FIG. 1.

A new top portion 18, FIG. 2, has been prepared, and comprises a corresponding length 11b of the tubular member, and is otherwise formed as the corresponding portion of the original nozzle.

An additional component is the internal support sleeve 17, mentioned above, which is introduced into portion 11b, and is welded to the latter so it will project a distance below its lower edge.

When the top portion 18 is fitted in the remaining stub portion 11a, a complete, new nozzle is obtained. The support sleeve 17 extends somewhat into the stub portion 11a, and ensures a satisfactory rigidity. The two tube portions 11a and 11b may be interconnected by tack welding, which does not call for a qualified workman. There is no need for the joint being airtight.

The shape and the size of the nozzle will have to suit the outlay of the furnace in general.

When a really hard wear is expected, as for instance in a circulating fluid bed, the repair work may be reduced if the nozzle is originally manufactured in two pieces according to FIGS. 2 and 3. It will then not be neccessary to cut the tubular membr at the first repair occasion—it will only be necessary to break a few tack welds and to remove the damaged top portion.

I claim:

1. An air supply nozzle for a fluid bed furnace, comprising a tubular member, and a lid closing one end thereof, said tubular member being provided with a number of air dispersing nozzles in the portion of its shell adjacent to said lid and having an un-perforated portion extending to its other end, which is formed for permanent attachment to a plate forming the bottom of the furnace, and wherein a wear-resisting ring of a hard metal with a thickness being noticeably bigger than the wall thickness of said tubular member and which has a height at least corresponding to the wall thickness of its own, is fitted to the closed end of said tubular member in such a manner that a void for refractory concrete is formed inside said ring, and above said lid.

2. An air supply nozzle according to claim 1, in which the tubular member is composed of two pieces mutually supported by a sleeve and connected by tack welding.

3. An air supply arrangement for a fluid bed furnace and of the type where a number of air supply nozzles, each comprising a tubular member project upwards from a plate forming the bottom of said furnace, and having a closed top with air dispersing openings in its shell, wherein said air dispersing openings are located adjacent to the top end of said tubular member, leaving a unperforated portion of the shell adjacent to the plate, and in which a ring of hard metal with a thickness being noticeably bigger than the thickness of said tubular member, and with a height at least corresponding to the wall thickness of its own is attached to the closed end of said tubular member in such a manner that said ring will project upward and outward of said tubular member, the void within the ring being filled with refractory concrete.

4. An air supply nozzle according to claim 3, in which said tubular member is upwardly closed by a lid mounted below the upper edge of said tubular member.

5. An air supply nozzle according to claim 3, in which said refractory concrete is formed like a dome projecting above said ring.

6. An air supply nozzle according to claim 3, in which said un-perforated portion of the tubular member has such extension that it can be cut below the air dispersing openings leaving a stub at said plate, and a new top portion, having openings, a ring and refractory concrete dome as well as an internal supporting sleeve may be attached to said stub.

* * * * *